US012785764B2

(12) United States Patent
Regev et al.

(10) Patent No.: US 12,785,764 B2
(45) Date of Patent: Nov. 3, 2026

(54) REDUCED COMPLEXITY DEMODULATOR BASED ON PRECODER OUTDATED METRIC

(71) Applicant: QUALCOMM Incorporated, San Diego, CA (US)

(72) Inventors: Aviv Regev, Tel Aviv (IL); Ronen Shaked, Kfar Saba (IL); Amit Bar-Or Tillinger, Tel Aviv (IL)

(73) Assignee: QUALCOMM Incorproated, San Diego, CA (US)

( * ) Notice: Subject to any disclaimer, the term of this patent is extended or adjusted under 35 U.S.C. 154(b) by 74 days.

(21) Appl. No.: 18/669,151

(22) Filed: May 20, 2024

(65) Prior Publication Data

US 2025/0357973 A1 Nov. 20, 2025

(51) Int. Cl.
*H04B 7/02* (2018.01)
*H04B 7/0456* (2017.01)

(52) U.S. Cl.
CPC .................................. *H04B 7/0456* (2013.01)

(58) Field of Classification Search
CPC .................................................... H04B 7/0456
USPC .......................................................... 375/267
See application file for complete search history.

(56) References Cited

U.S. PATENT DOCUMENTS

| | | | | |
|---|---|---|---|---|
| 12,432,729 B2 * | 9/2025 | Wang | H04W 72/20 | |
| 2014/0376652 A1 * | 12/2014 | Sayana | H04B 7/0478 375/267 | |
| 2018/0059769 A1 | 3/2018 | Sripathi et al. | | |
| 2018/0234208 A1 * | 8/2018 | Castelain | H04L 5/0007 | |
| 2021/0234580 A1 * | 7/2021 | El-Keyi | H04L 25/0204 | |

OTHER PUBLICATIONS

International Search Report and Written Opinion—PCT/US2025/023432—ISA/EPO—Jul. 15, 2025.

* cited by examiner

*Primary Examiner* — Helene E Tayong
(74) *Attorney, Agent, or Firm* — ArentFox Schiff, LLP

(57) ABSTRACT

This disclosure provides systems, methods and apparatuses for demodulating multiple-input multiple-output (MIMO) transmissions using iterative demodulation of spatially separated streams. A user equipment (UE) transmits a request for precoder information for iterative demodulation of spatially separated streams. The UE receives, from a network entity, an indication of a latest slot from which a precoder was evaluated. The UE may perform iterative demodulation with a number of iterations based on the latest slot from which the precoder was evaluated. The number of iterations may be based on a mapping of a gap length between the latest slot from which the precoder was evaluated and a current slot to a number of iterations for the iterative demodulation to satisfy an error vector magnitude threshold.

28 Claims, 11 Drawing Sheets

700

600

710

| *G* | *K* |
|---|---|
| 0-2 | 0 |
| 3-9 | 1 |
| 10-14 | 2 |
| 15-17 | 3 |
| 18-19 | 4 |
| 20 | 5 |
| 21 | 6 |
| 22 | 7 |
| 23-28 | 8 |
| >28 | Alternatives |

REDUCED COMPLEXITY DEMODULATOR BASED ON PRECODER OUTDATED METRIC

TECHNICAL FIELD

The present disclosure relates to wireless communications including multiple-input, multiple-output (MIMO) demodulation using a reduced complexity demodulator based on a precoder outdated metric.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

In some aspects, the techniques described herein relate to an apparatus for wireless communication, including: one or more memories storing computer-executable instructions; and one or more processors coupled with the one or more memories and configured to execute the computer-executable instructions, individually or in combination, to cause the apparatus to: transmit, from a user equipment (UE), a request for precoder information for iterative demodulation of spatially separated streams; and receive, from a network entity, an indication of a latest slot from which a precoder was evaluated.

In some aspects, the techniques described herein relate to an apparatus for wireless communication at a network entity, including: one or more memories storing computer-executable instructions; and one or more processors coupled with the one or more memories and configured to execute the computer-executable instructions, individually or in combination, to cause the apparatus to: receive, from a UE, a request for precoder information for iterative demodulation of spatially separated streams; and transmit an indication of a latest slot from which a precoder was evaluated.

In some aspects, the techniques described herein relate to a method of wireless communication, including: transmitting, from a UE, a request for precoder information for iterative demodulation of spatially separated streams; and receiving, from a network entity, an indication of a latest slot from which a precoder was evaluated.

In some aspects, the techniques described herein relate to a method of wireless communication at a network entity, including: receiving, from a UE, a request for precoder information for iterative demodulation of spatially separated streams; and transmitting an indication of a latest slot from which a precoder was evaluated.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
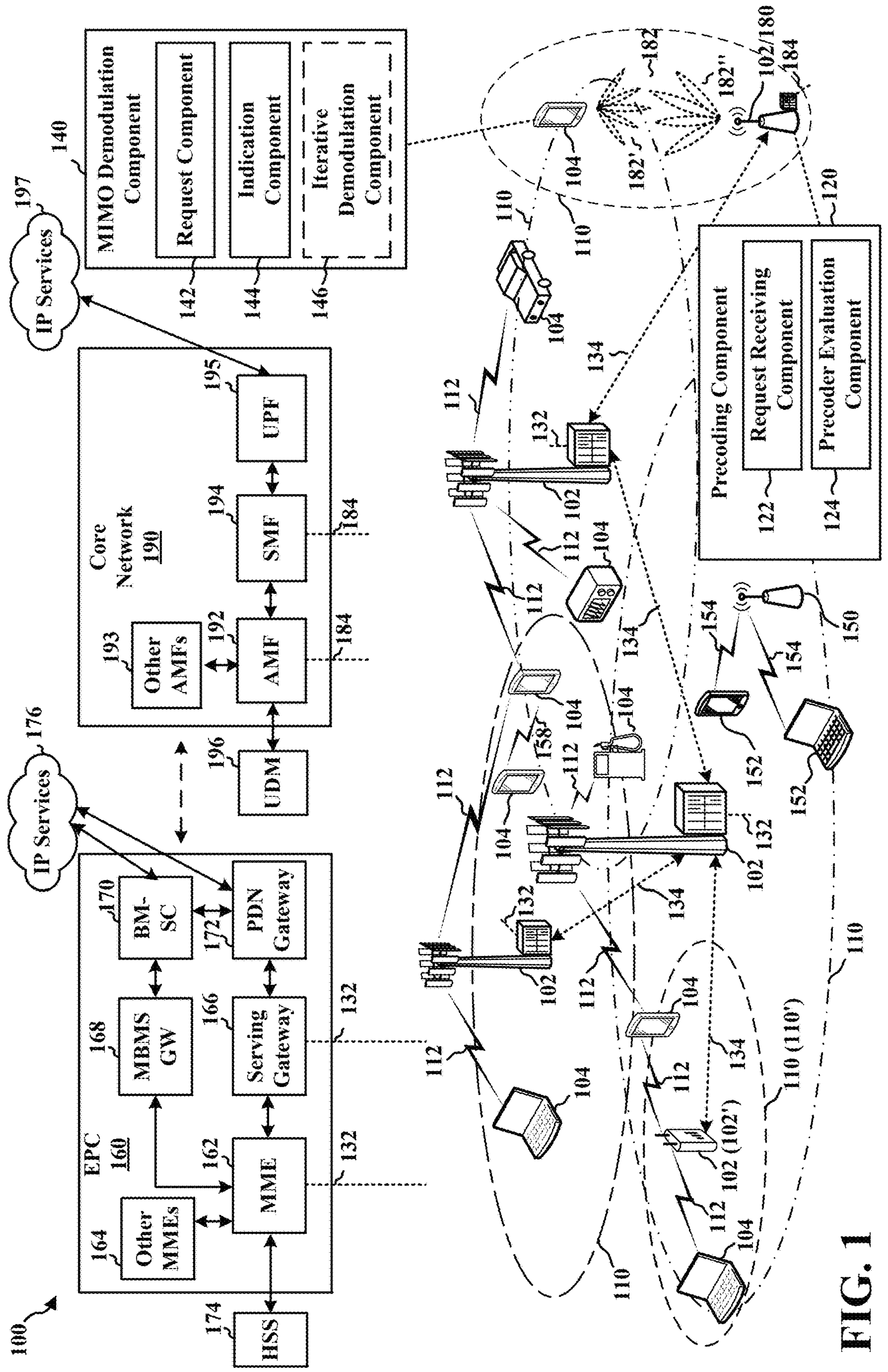
FIG. 1 is a diagram illustrating an example of a wireless communications system including an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

In a wireless communications network such as a 5G NR network, multiple-input, multiple-output (MIMO) transmissions utilize multiple antennas at a transmitter and a receiver to transmit data in multiple layers, thereby increasing throughput. One of the most power consuming tasks at the user equipment (UE) side is the downlink (DL) demodulation process, which includes estimating the transmitted data, from the received data, based on the estimated channel and noise. In that process, the UE needs to calculate the demodulated signal per occupied subcarrier (SC). That process may involve complex calculations such as matrix inversions (in the case of a linear minimum mean squared error (LMMSE) equalizer) or many hypothesis checking (in the case of per stream recursive decoder (PSRD)—approximation to maximum likelihood (ML)). Furthermore, next generation MIMO systems are planned to include more streams (up to 8 layers), which will increase complexity and power consumption. Accordingly, there is a need to reduce the power consumption of the UE in a DL MIMO system.

To reduce this complexity at the UE, it is worthwhile considering the case of a Tx precoder that aims at separating the different streams (such as a single variable decomposition (SVD)) precoder. Using such a precoder to produce spatially separated streams can reduce the number and/or the complexity of the calculations needed for the demodulation. In that scenario, the MIMO system can be treated as multiple parallel SISO systems. Particularly, the LMMSE equalizer expression would then include an inverse matrix of a diagonal matrix. In that case, the complexity of the matrix inversion is much less compared to the inversion of a full matrix (o(n) instead of o($n^3$)). However, in practical systems, the applied precoder is updated only once in a while (for example once in 40 slots=20 mS), while the channel can change during that time, which can cause a mismatch between the applied precoder (SVD) and the channel. In that case, the precoder becomes outdated and then the matrix that needs to be inverted will not be a diagonal anymore and the inversion will incur high complexity and latency. Further, in conventional networks, the UE is not aware of when the precoder is updated.

In an aspect, the present disclosure provides a demodulator that demodulates MIMO transmissions using an iterative method to perform the inversion using an approximate algorithm. For example, an iterative algorithm called conjugate gradient (CG) may be used instead of the full matrix inversion. The number of iterations in the CG algorithm is determined based on the slots gap between the current processed slot and the latest slot from which the SVD precoder was evaluated. In general, the number of required iterations grows as this slots gap grows. To facilitate selection of the number of iterations, the UE may request precoder information such as the latest slot from which the precoder was evaluated and/or an update rate of the precoder. A network entity may indicate the latest slot. The UE may then select the number of iteration based on the slot gap to determine a minimum number of iterations to achieve desired performance.

In an aspect, the demodulation techniques described herein provide a reduced complexity demodulator that reduces power consumption compared to current MIMO demodulators. Accordingly, the techniques disclosed herein allow realization of the higher throughput of MIMO transmissions at a lower cost in terms of power consumption.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 include a MIMO demodulation component 140. The MIMO demodulation component 140 is configured to demodulate a multiple-input multiple-output (MIMO) transmission. The MIMO demodulation component 140 includes a request component 142, an indication component 144, and an iterative demodulation component 146. The request component 142 is configured to transmit, from a user equipment (UE), a request for precoder information for iterative demodulation of spatially separated streams. The indication component 144 is configured to receive, from a network entity, an indication of a latest slot from which a precoder was evaluated. The iterative demodulation component 146 is configured to perform iterative demodulation with a number of iterations based on the latest slot from which the precoder was evaluated.

In some implementations, one or more of the base stations 102 includes a precoding component 120 configured to precode a MIMO transmission to produce spatially separated streams. For example, the precoding component 120 may utilize single variable decomposition (SVD) to match a precoder to the channel. The precoding component 120 includes a request receiving component 122 and a precoder evaluation component 124. The request receiving component 122 is configured to receive, from a UE, a request for precoder information for iterative demodulation of spatially separated streams. The precoder evaluation component 124 is configured to transmit an indication of a latest slot from which a precoder was evaluated.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figure 2A:
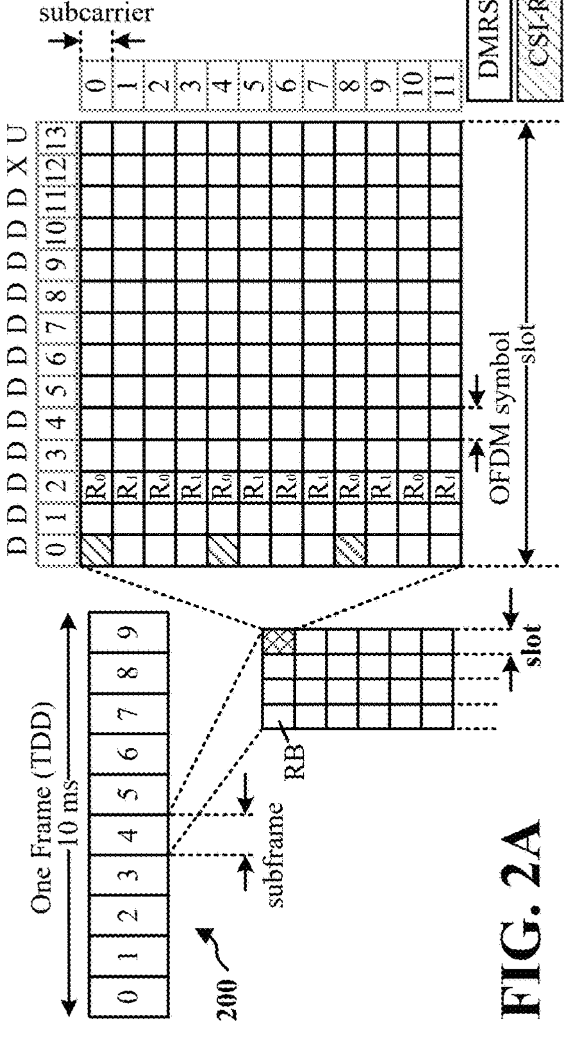
FIG. 2A is a diagram illustrating an example of a first frame.
Figure 2B:
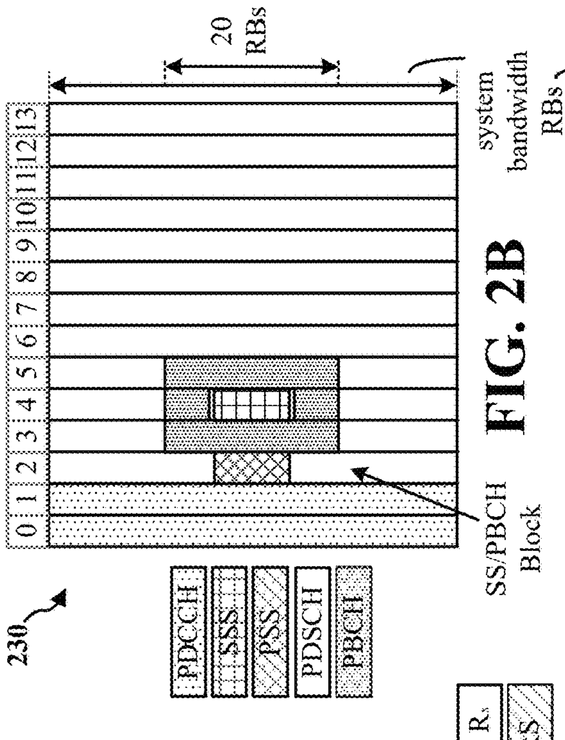
FIG. 2B is a diagram illustrating an example of DL channels within a subframe.
Figure 2C:
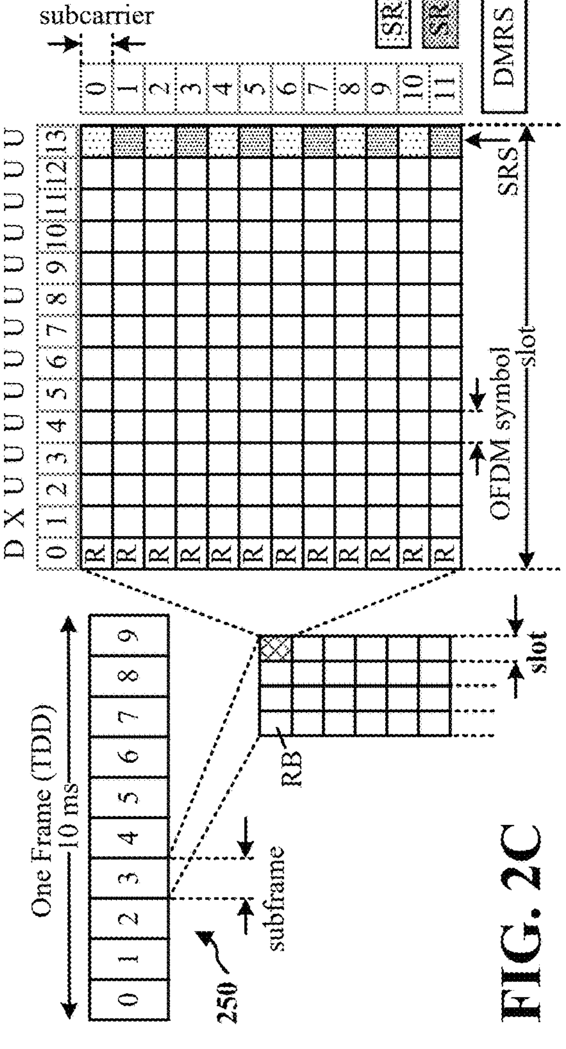
FIG. 2C is a diagram illustrating an example of a second frame.
Figure 2D:
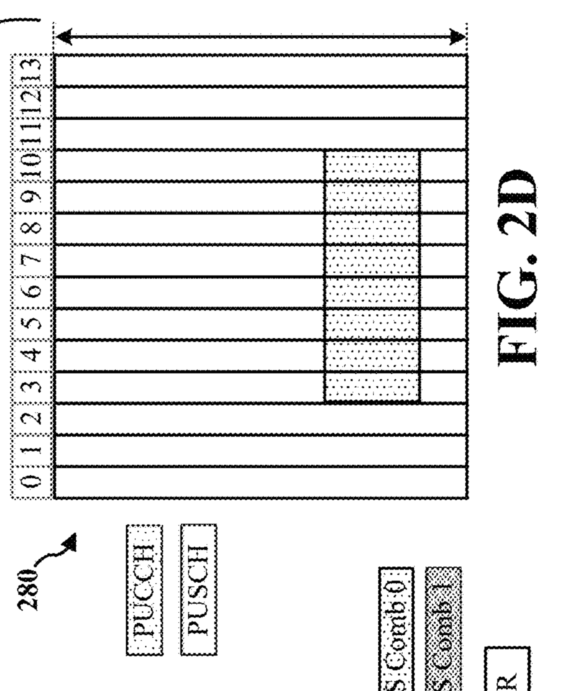
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as Rx for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a L1 identity. A secondary synchronization signal (SSS) may be within symbol 4 of particular subframes of a frame. The SSS is used by a UE to determine a L1 cell identity group number and radio frame timing. Based on the L1 identity and the L1 cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
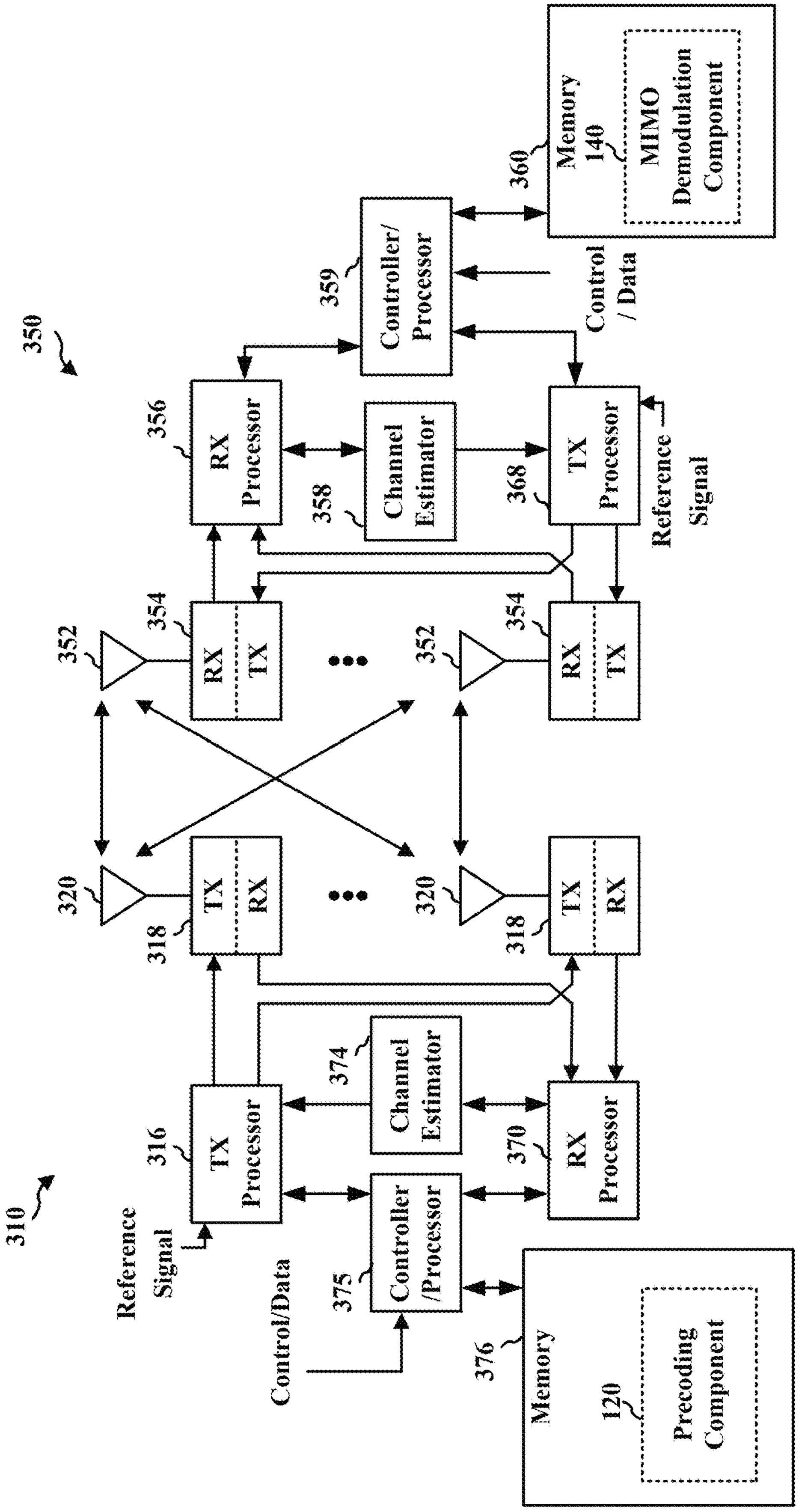
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium and may be any of the types of computer-readable mediums discussed herein (e.g., RAM, ROM, EEPROM, optical disk storage, magnetic disk storage, other magnetic storage devices, combinations of the aforementioned types of computer-readable media, or any other medium that can be used to store computer executable code in the form of instructions or data structures that can be accessed by a computer). In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium and may be any of the types of computer-readable mediums discussed herein (e.g., RAM, ROM, EEPROM, optical disk storage, magnetic disk storage, other magnetic storage devices, combinations of the aforementioned types of computer-readable media, or any other medium that can be used to store computer executable code in the form of instructions or data structures that can be accessed by a computer). In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the MIMO demodulation component 140 of FIG. 1. For example, the memory 360 may include executable instructions defining the MIMO demodulation component 140. The TX processor 368, the RX processor 356, and/or the controller/processor 359 may be configured to execute the MIMO demodulation component 140. In some implementations, at least one of the TX processor 368, the RX processor 356, and the controller/processor 359 may be configured to execute the precoding component 120 for uplink transmissions.

At least one of the TX processor 316, the RX processor 370, and the controller/processor 375 may be configured to perform aspects in connection with the MIMO demodulation component 140 of FIG. 1. For example, the memory 376 may include executable instructions defining the MIMO demodulation component 140. The TX processor 316, the RX processor 370, and/or the controller/processor 375 may be configured to execute the MIMO demodulation component 140. In some implementations, at least one of the TX processor 368, the RX processor 356, and the controller/processor 359 may be configured to execute the precoding component 120 for downlink transmissions.

Figure 4:
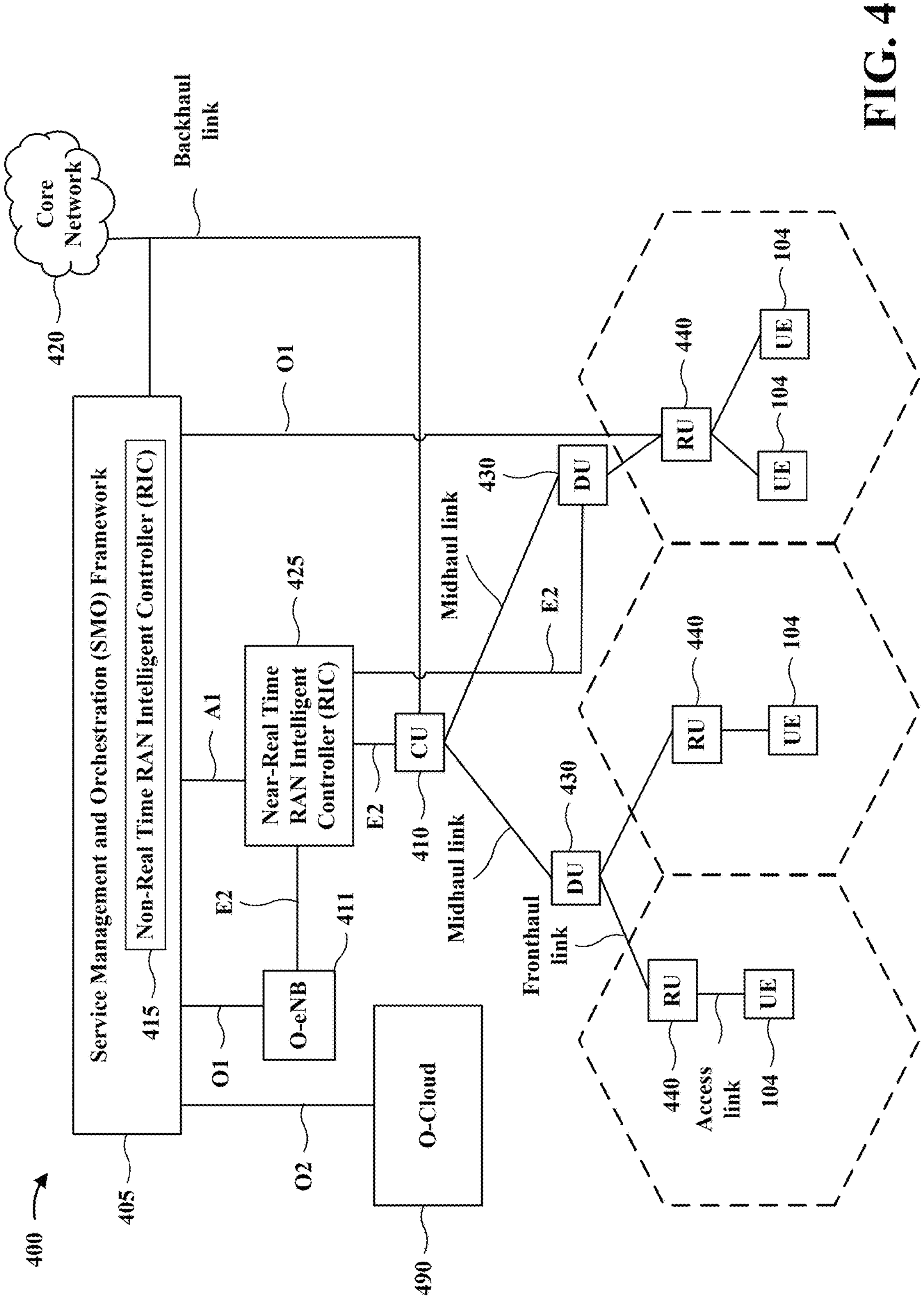
FIG. 4 is a diagram illustrating an example disaggregated base station architecture.

FIG. 4 is a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUS 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
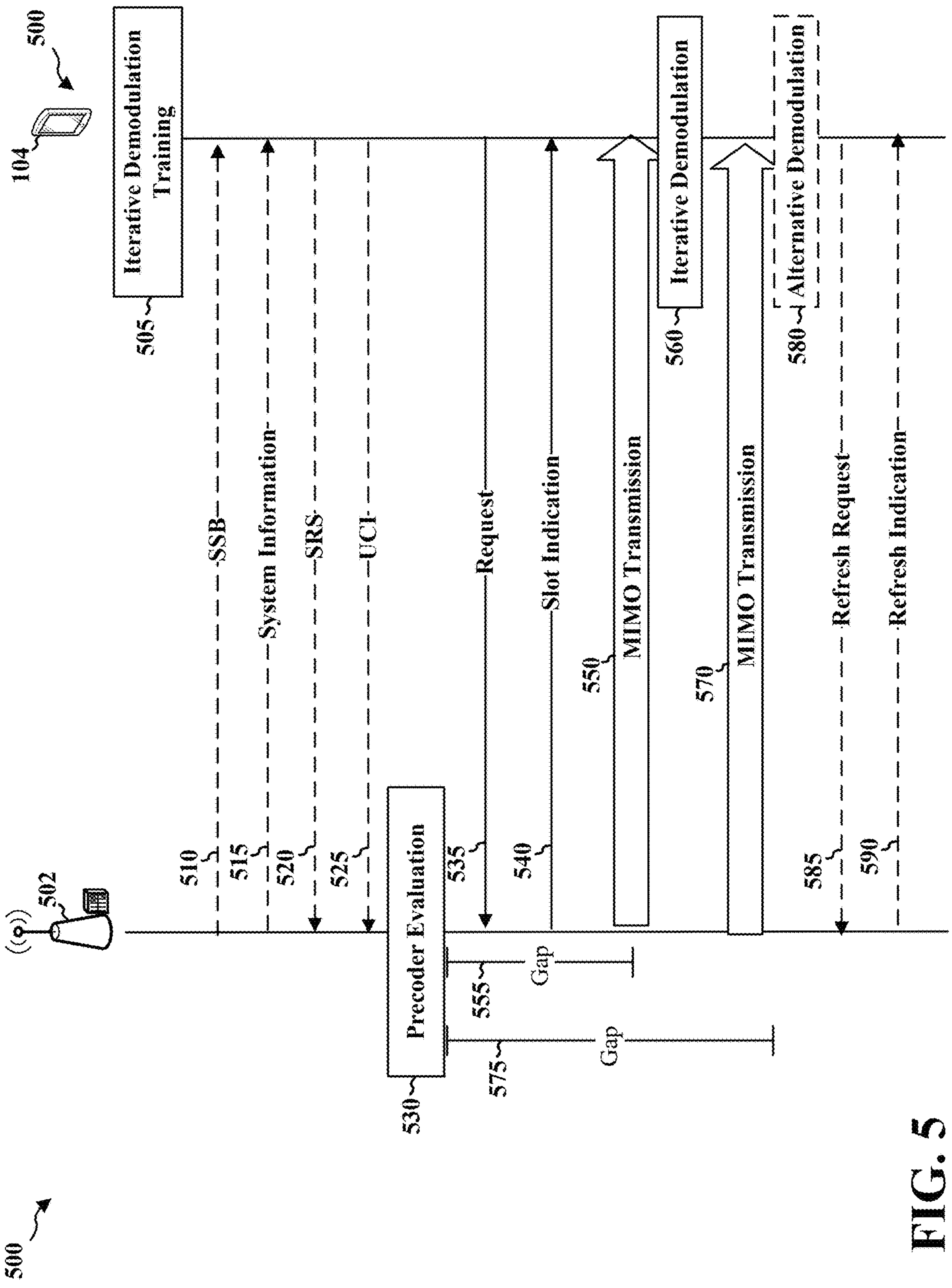
FIG. 5 is a message diagram illustrating various messages and actions for iterative demodulation of a MIMO transmission.

FIG. 5 is a message diagram 500 illustrating various messages for demodulating MIMO transmissions with iterative demodulation. The UE 104 may be in communication with one or more base stations 502. The base station 502 may provide a primary cell and/or secondary cells. For illustrative purposes, the base station 502 is shown as transmitting a downlink MIMO transmission, and the UE 104 is shown as receiving and demodulating the downlink MIMO transmission.

In an aspect, iterative demodulation may be used to demodulate a MIMO transmission when a precoder for the MIMO transmission is closely matched to the channel, for example, using SVD. As the channel changes over time, the precoder becomes less closely matched, so more iterations of the iterative demodulation are needed. Eventually, the precoder may become too mismatched for the iterative demodulator to feasibly achieve a desired error rate. The messages illustrated in FIG. 5 allow the receiving device (e.g., UE 104) to select a number of iterations for a particular MIMO transmission.

The UE 104 may perform initial iterative demodulation training 505. The initial iterative demodulation training 505 may be based on simulations and/or testing to develop a mapping between a gap since a slot in which the precoder was last evaluated and a number of iterations. The mapping may vary based on channel conditions, Doppler effects, and modulation and coding scheme (MCS). For example, the mapping may be expressed as one or more tables, a weighted formula, or a trained model.

A base station 502 may transmit a synchronization signal block (SSB) 510. The SSB 510 may include a primary synchronization signal (PSS), a secondary synchronization signal (SSS), and a physical broadcast channel (PBCH). The PBCH may carry some information for the cell provided by the base station 502. For example, the PBCH may indicate a location for system information 515. The base station 502 may transmit the system information 515. The system information 515 may include parameters for MIMO transmissions. For example, the system information 515 may indicate a number of antenna groups and a number of layers for various channels. In some implementations, the system information 515 may indicate whether the base station 502 provides precoder refresh information.

The UE may transmit a reference signal such as a sounding reference signal (SRS) 520 to allow the base station 502 to measure channel conditions. In some implementations, the UE 104 may transmit uplink control information (UCI) including UE measurements of channel conditions.

The base station 502 may perform precoder evaluation 530, for example, based on the SRS 520 and/or the UCI 525. For instance, the precoder evaluation 530 may include SVD decomposition of the channel (H). In this approach, the channel matrix is diagonalized by taking an SVD and removing the two unitary matrices through pre- and post-multiplication at the transmitter and receiver. The SVD precoder definition is to take the precoder to be equal to the right unitary matrix. The precoder evaluation 530 produces a precoder that spatially separates the streams of the MIMO transmission.

The UE 104 may transmit a request 535 for precoder information for iterative demodulation of spatially separated streams. In some implementations, the request 535 may be an indication of a capability for iterative demodulation of spatially separated streams. For example, the request 535 may be transmitted as an RRC message indicating capabilities of the UE. In some implementations, the request 535 may be a media access control-control element (MAC-CE) that is transmitted upon attachment to a network entity such as the base station 502.

The base station 502 may transmit a slot indication 540 that indicates a latest slot from which the precoder was evaluated. That is, the slot indication 540 refers to the last slot from which the precoder evaluation 530 was performed. For instance, the slot indication 540 may indicate the slot in which the SRS 520 was transmitted by the UE 104. The slot indication 540 may indicate a slot number or a number of slots that have elapsed between the slot from which the precoder evaluation 530 was performed and the slot in which the slot indication 540 is transmitted. In some implementations, the slot indication 540 includes an indication of a refresh rate of the precoder. For instance, the refresh rate may be a number of slots between performing the precoder evaluation 530.

The base station 502 may transmit a MIMO transmission 550. The MIMO transmission 550 may be precoded with the precoder determined during the precoder evaluation 530. There is a gap 555 between the precoder evaluation 530 and the MIMO transmission 550. The UE 104 can determine the length of the gap 555 based on the slot indication 540. For instance, the UE 104 may subtract the slot number indicated by the slot indication 540 from a slot number of the received MIMO transmission 550. The UE 104 may perform iterative demodulation 560 (e.g., using the CG algorithm, a Newton-Raphson method for calculating the roots of a given function, or other techniques based on zero forcing or minimum mean squared error (MMSE)) with a number of iterations selected based on the length of the gap 555. The number of iterations may also be based on one or both a delay spread or a modulation and coding scheme for the MIMO transmission. For example, the UE 104 may be configured with one or more mappings from the length of the gap 555 to the number of iterations based on the iterative demodulation training 505. Different mappings or adjustments to the mapping may be applied based on channel conditions, Doppler effects, and modulation and coding scheme. Generally, a faster delay spread causes a mismatch between the precoder and the channel, requiring a greater number of iterations. Similarly, a higher modulation and coding scheme may require a greater number of iterations.

The base station 502 may transmit a second MIMO transmission 570 that is precoded with the same precoder from the precoder evaluation 530. For the second MIMO transmission 570, the gap 575 is larger than the gap 555. For instance, the slot indication 540 may be the same as for the MIMO transmission 550, but the slot number of the received MIMO transmission 570 may be greater. Accordingly, the mismatch between the precoder and the channel is likely greater, so the UE 104 may select a larger number of iterations for the iterative decoder. In some implementations, the mismatch may be too great for the iterative decoder to feasibly satisfy a threshold error rate. In some implementations, the UE 104 may perform alternative demodulation 580 with an alternative demodulator in response to a gap length between the latest slot from which the precoder was evaluated and a current slot being greater than a threshold. For example, the alternative demodulator may include LMMSE or PSRD, which may have greater complexity or power consumption than the iterative decoder. However, use of the iterative decoder while the gap 555 is smaller than the threshold may reduce average power consumption. In some implementations, the UE 104 may transmit a request 585 to modify a refresh rate of the precoder based on an error vector magnitude corresponding to a gap length between the latest slot from which the precoder was evaluated and a current slot. For example, the error vector magnitude for a gap length may indicate an amount of error due to the mismatch between the precoder and the channel. That is, when the length of gap 575 corresponds to an error vector magnitude where the iterative demodulator is not feasible, the UE 104 may request a more frequent refresh rate of performing the precoder evaluation 530 such that the gap length does not exceed a threshold. In other implementations, the refresh request 585 may request to change the refresh rate for the precoder or change a modulation and coding scheme in response to determining that an iterative demodulator cannot satisfy a threshold error rate based on a current modulation and coding scheme and number of slots since the precoder was evaluated. The base station 502 may transmit a refresh indication 590 indicating a change to the refresh rate of the precoder. For example, the refresh indication 590 may be a physical layer signal such as a downlink control information (DCI) or field thereof.

Figure 6:
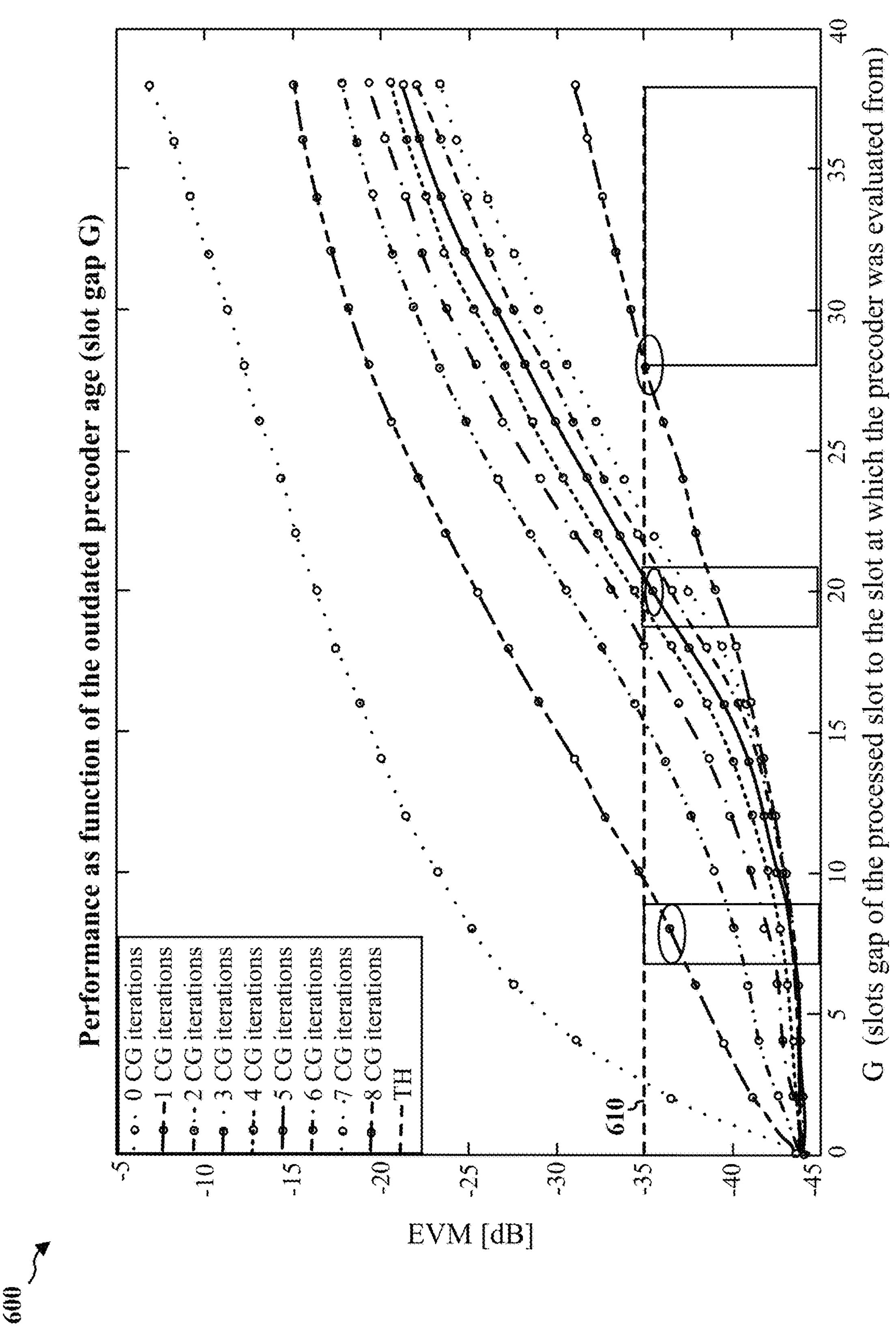
FIG. 6 is a diagram of performance of an iterative demodulator with respect to a number of slots since a last slot from which a precoder was evaluated.

FIG. 6 is a chart 600 of performance of an iterative demodulator with respect to a number of slots since a last slot from which a precoder was evaluated. For example, the precoder may be evaluated at precoder evaluation 530 in FIG. 5 using SVD decomposition to match the precoder to the channel.

The SVD decomposition of the channel (H) is given by $H=U\Sigma V^H$ where U, and V are unitary matrixes which include the left and right singular vectors of H respectively and $\Sigma=\text{diag}(\sigma)$ is a diagonal matrix which includes the singular values of H. The SVD precoder definition is to take the precoder p to be equal to V. The precoded channel ($\tilde{H}$) is then given by the FD multiplication of the channel (H) and the precoder (p), i.e., $\tilde{H}=Hp$. Thus, the channel inner product can be represented as $(\tilde{H})^H\cdot(\tilde{H})=(Hp)^H\cdot(Hp)=(U\Sigma V^H V)^H(U\Sigma V^H V)=\Sigma' U' U S=\Sigma'\Sigma=\text{diag}(\sigma^2)$.

The demodulated signal expression is given by $\hat{x}=Wy$, where x, Wand y are the transmitted signal, the LMMSE demodulation matrix and the received signal respectively. The expression for the demodulation matrix is $$W=\left(\tilde{H}^H\tilde{H}+\sigma_n^2 I\right)^{-1}\tilde{H}^H,\ \text{where } \sigma_n^2$$

and I are the additive noise variance and the identity matrix respectively. According to the channel representation, the matrix to be inverted in the demodulation matrix expression is diagonal if the precoder is matched to the channel (i.e., if p is the SVD of the channel). Otherwise, if the precoder is not matched (i.e., $p=V'+\Delta$, where $\Delta$ is the mismatched expression of p), that matrix to be inverted (based on the channel inner product) is not diagonal. Hence, in that scenario the matrix inversion becomes more complex. The complexity of the inversion depends on how severe A is and how much its neglectable with respect to V'.

For that scenario, where the precoder is not matched to the channel an iterative demodulator such as a conjugate gradient (CG) algorithm for the matrix inversion of the demodulation matrix. For example, consider $$W=[w_1, w_2, \ldots, w_N]\ \text{and}\ H^H=\left[h_1^H, h_2^N, \ldots, h_n^H\right]$$

where $w_i$ and $h_i$ are the $i^{th}$ column of the LMMSE demodulation matrix and the $i^{th}$ row of the channel, respectively. Then according to the matrix inversion of the demodulation matrix, $$w_i=\left(\tilde{H}^H\tilde{H}+\sigma_n I\right)^{-1}h_i^H.$$

That is equivalent to the system of equations $Ax=b\rightarrow x=A^{-1}b$ where $x=w_i$;

$$A=\left(\tilde{H}^H\tilde{H}+\sigma_n I\right)\ \text{and}\ b=h_i^H.$$

by that equivalence, the CG algorithm can be used for calculating $w_i$ for each column i, i.e., for fully calculating W.

In the CG algorithm, an initial guess of the solution vector $w_i$ can be set to incur an easy to calculate expression: the inverse diagonal of the matrix to be inverted, i.e., $$A=\left(\tilde{H}^H\tilde{H}+\sigma_n I\right)\rightarrow \hat{w}_i^{init}=\frac{1}{\text{diag}(A)}*h_i^H.$$

If A is a diagonal matrix (i.e., if there is no mismatch between the precoder and the channel) then the initial guess would already be the exact solution:

$$\hat{w}_i^{init}=w_i.$$

The CG algorithm preforms a full matrix inversion if it is given the full number of iterations it needs (N iterations, where N is the dimension of the A). The demodulation error vector magnitude $$(EVM)\ \|\hat{x}-x\|_2^2 = \left\|\hat{W}y - x\right\|_2^2$$

the number of CG iterations and the slots gap from the last precoder update can be tested via simulation.

In the chart 600, simulated results of the CG algorithm with a number of iterations are shown. In the example simulation, the number of streams is 8, the number of transmit antennas is 16, and the number of receive antennas is 8. Therefore, the LMMSE equalizer is of size: $W \in C^{8\times 8}$. The channel is characterized as TDL-a. The delay spread is 30 ns, the velocity is 10 kph, and the SNR is 42 dB. The MCS is 1k QAM with rate 0.92. The CG algorithm is evaluation for different slots gaps and with different numbers of iterations.

Each line represents the EVM of the CG algorithm after a fixed number of iterations applied to a received signal after the gap (G) from the last slot from which the precoder was evaluated. As can be seen, for slots gap G=0 (the precoder is matched to the channel) all the values of K have the same performance. This happens because the precoder is fully matched to the channel, and $$\hat{w}_i^{init} = w_i \forall\ i.$$

Thus, no CG iterations are needed to find $w_i$. The EVM is degrading as the slots gap of the current processed slot to the slot at which the precoder was evaluated from, increases. However, increasing the number of CG iterations (K) compensates this degradation, i.e., this degradation is less severe as the number of iterations K is greater.

In an aspect, there may be a desired EVM that allows decoding of a transmission with a MCS and an acceptable error rate. For example, an EVM threshold 610 may be set to −35 dB for a 1K QAM constellation. This value is determined according to Shannon's capacity theory where the desired EVM for the reception of N uncoded bits is: $desired_{EVM} = -3 \cdot N - TH$, where TH is a guard interval which depends on the system needs. As illustrated, for G=0, the EVM is better (lower) than the desired EVM threshold 610. Thus, in that case the UE 104 may perform zero CG iterations to save demodulation complexity and therefore power. As the slots gap G increases, a number of iterations that produces an EVM less than the EVM threshold 610 may be selected. For example, for G=8, i.e., 8 slots after the precoder was evaluated from, the UE can perform 1 CG iteration because this is the minimum number of iterations that will lead to an EVM that it sufficient to demodulate successfully the operated MCS. Similarly, the UE 104 may choose 5 iterations for G=20 and 8 iterations for G=28. Thus, based on these simulation results (corresponding to iterative demodulation training 505) the UE 104 can choose the minimal number of CG iterations (K) for each slots gap (G).

For latter time slots of G>28 the attained EVM is poorer than the required EVM threshold 610. Hence the UE may use alternative demodulation 580 (with a more complex receiver such as PSRD) to yield better EVM. Or alternatively, for example, if the UE 104 does not have an alternative PSRD, the UE 104 may warn that after 28 slots the UE 104 will not be able to demodulate successfully the operated MCS, and thus the base station should reduce the MCS or apply the matched precoder more frequently.

Figure 7:
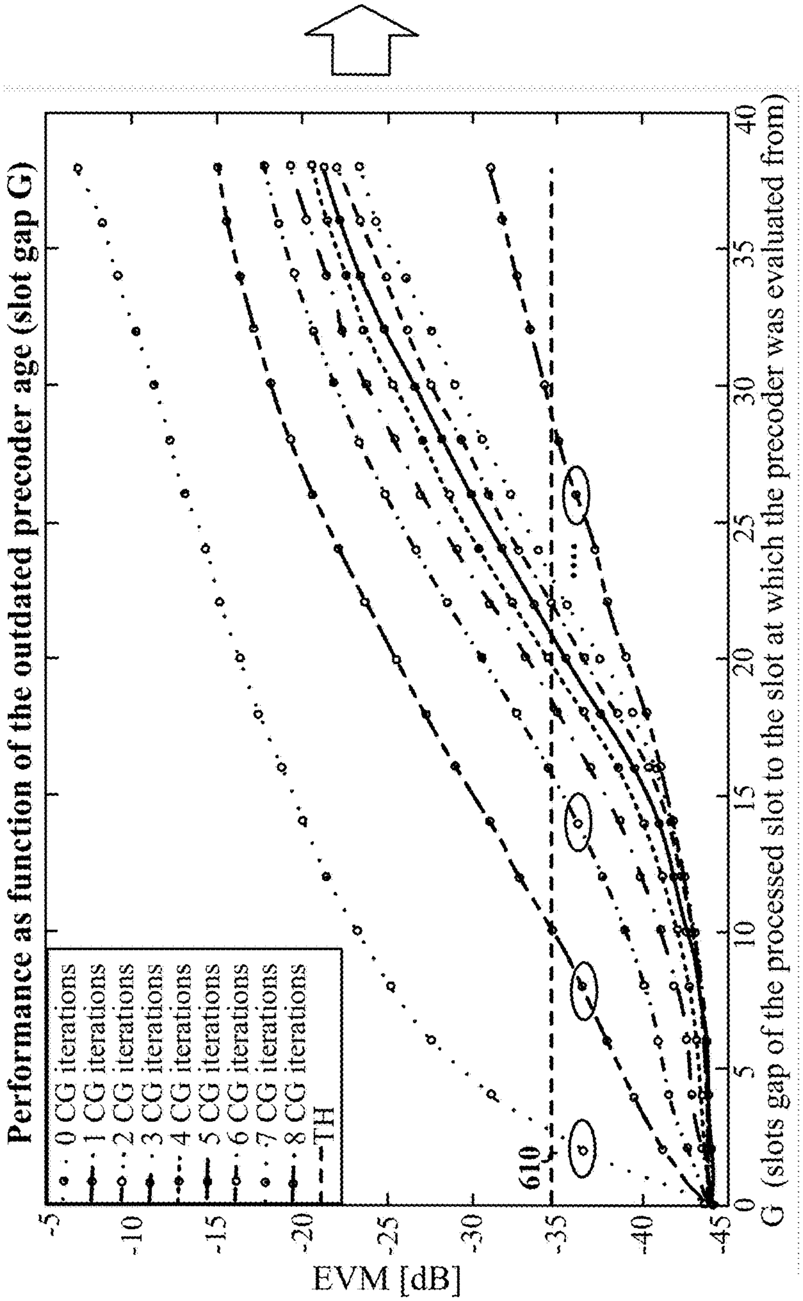
FIG. 7 is a diagram of a selected number of iterations based on performance of the iterative demodulator.

FIG. 7 is a diagram 700 of a selected number of iterations for a mapping 710 based on performance of the iterative demodulator. Once again, the chart 600 illustrates the performance of the iterative demodulator. The mapping 710 maps ranges of the length of gap (G) to a number of iterations. For each number of iterations, the maximum gap length that can result in an EVM less than the threshold may define the range of gaps mapped to the number of iterations.

It should be understood that the example mapping 710 is specific for the simulation conditions including the MCS and Doppler spread and velocity. Note that results for other velocities can be concluded from the test. For example, doubling the velocity to 20 kph and dividing G by 2 will be equivalent. Further, the iterative demodulation training 505 may include multiple tests or simulations, for example, to account for different modulation and coding scheme, link capacity, or velocity. In some implementations, the UE 104 may be configured with multiple mapping tables. Alternatively, the mapping may be expressed as a formula or machine-learning model trained to output the number of iterations to satisfy the EVM threshold 610.

Figure 8:
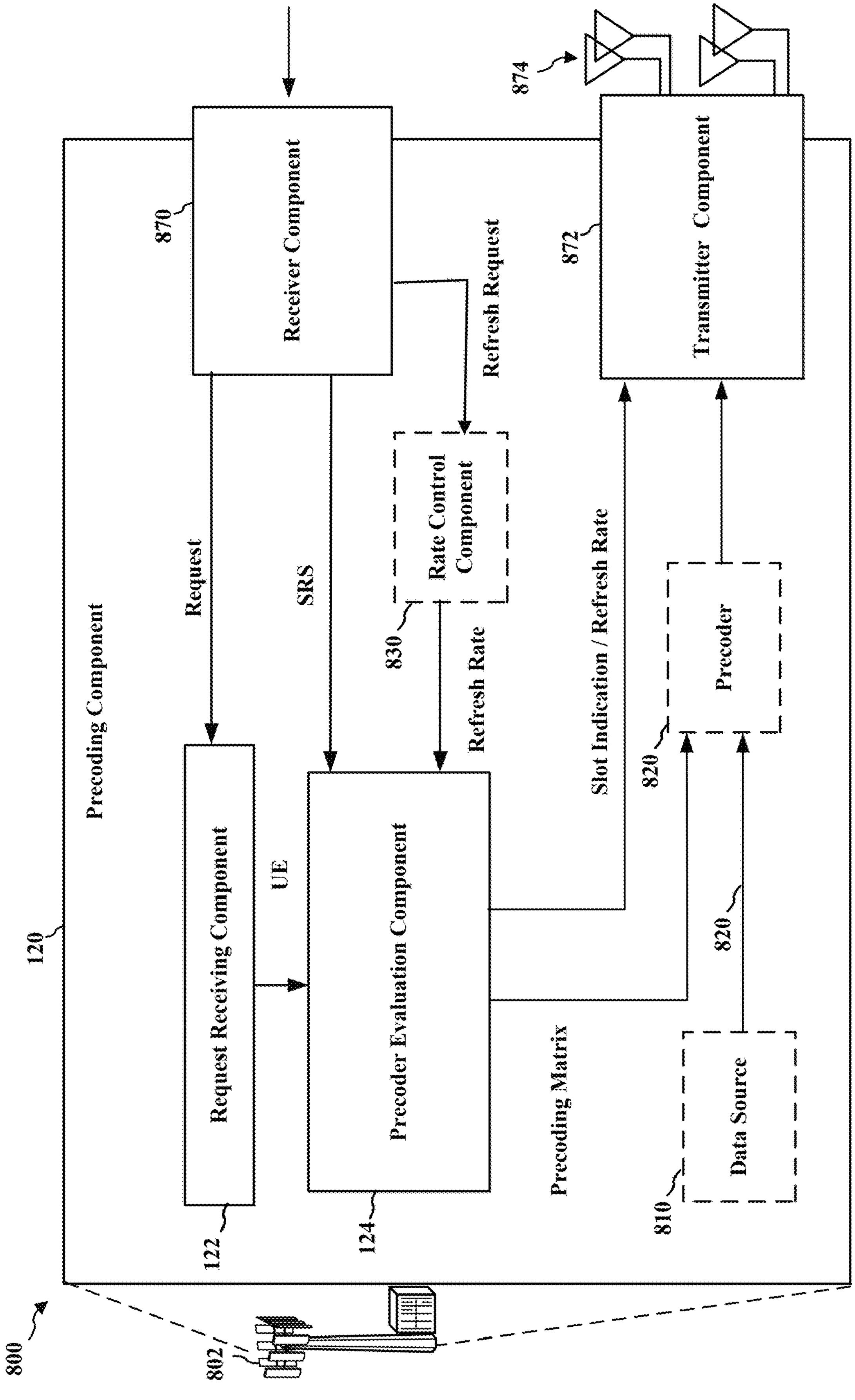
FIG. 8 is a conceptual data flow diagram illustrating the data flow between different means/components in an example network element.

FIG. 8 is a conceptual data flow diagram 800 illustrating the data flow between different means/components in a network entity 802, which may be an example of the base station 102 (FIG. 1) or the base station 502 (FIG. 5) and include the precoding component 120. The precoding component 120 may be implemented by the memory 376 and the TX processor 316, the RX processor 370, and/or the controller/processor 375. For example, the memory 376 may store executable instructions defining the precoding component 120 and the TX processor 316, the RX processor 370, and/or the controller/processor 375 may execute the instructions.

The network entity 802 may include a receiver component 870, which may include, for example, a RF receiver for receiving the signals described herein via antennas 874. The network entity 802 may include a transmitter component 872, which may include, for example, an RF transmitter for transmitting the signals described herein. In an aspect, the receiver component 870 and the transmitter component 872 may co-located in a transceiver such as the TX/RX 318 in FIG. 3.

As discussed with respect to FIG. 1, the precoding component 120 includes the request receiving component 122, the precoder evaluation component 124. In some implementations, the precoding component 120 may optionally include a precoder 820 and a rate control component 830.

The receiver component 870 may receive UL signals described herein such as the SRS 520, UCI 525, request 535, and refresh request 585. The receiver component 870 may output the SRS 520 and/or the UCI 525 to the precoder evaluation component 124. The receiver component 870 may output the request 535 to the request receiving component 122. The receiver component 870 may output the refresh request 585 to the rate control component 830.

The request receiving component 122 is configured to receive the request 535 for precoder information for iterative demodulation of spatially separated streams from the UE 104 via the receiver component 870. The request receiving component 122 may identify the UE 104 based on the request 535 and provide an identifier of the UE to the precoder evaluation component 124.

The precoder evaluation component 124 is configured to evaluate the precoder 820. For example, the precoder evaluation component 124 may select a precoder matrix based on the SRS 520 received via the receiver component 870. The precoder evaluation component 124 may output an updated precoder matrix to the precoder 820. The precoder evaluation component 124 is also configured to transmit an indication 540 of a latest slot from which the precoder 820 was evaluated.

The precoder 820 is configured to precode data from a data source 810 for transmission. For example, the precoder 820 may multiply the symbols for transmission by the precoding matrix. The precoder 820 may transmit the MIMO transmission 550, 570 via the transmitter component 872.

The rate control component 830 is configured to receive a request 585 to change a refresh rate for the precoder or change a modulation and coding scheme. The rate control component 830 may set the rate of the precoder evaluation component 124 to perform precoder evaluation 530. For example, the rate control component 830 may set the rate such that the gap 575 does not exceed a maximum gap size for the iterative demodulator of the UE 104. In some implementations, the rate control component 830 may configure the transmitter component 872 with a MCS with a corresponding EVM threshold 610 that allows the UE 104 to use the iterative demodulator with a current rate of the precoder evaluation component 124 to perform precoder evaluation 530.

Figure 9:
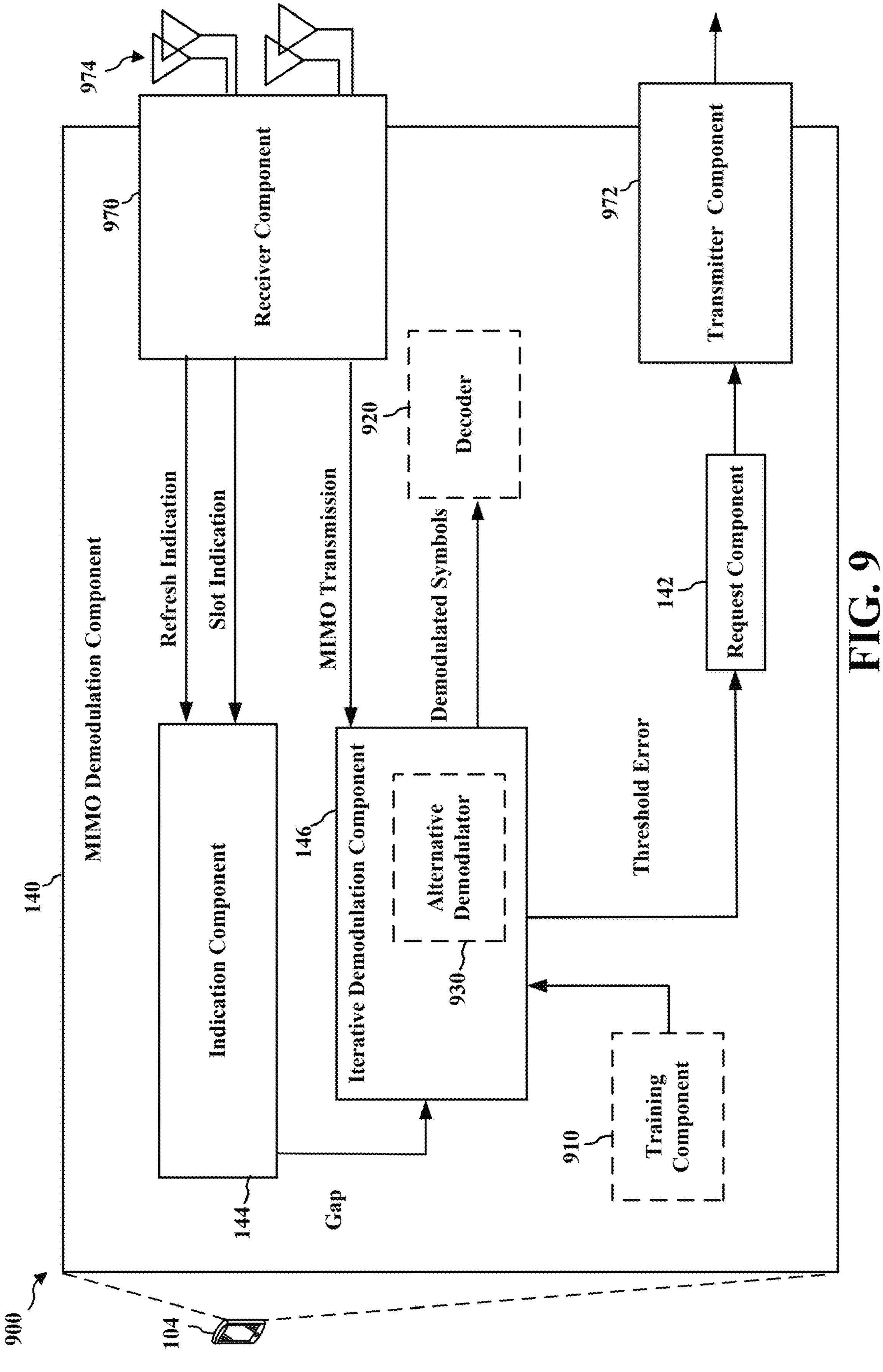
FIG. 9 is a conceptual data flow diagram illustrating the data flow between different means/components in an example user equipment.

FIG. 9 is a conceptual data flow diagram 900 illustrating the data flow between different means/components in an example UE 104, which may be an example of the UE 104 (FIG. 1) and include the MIMO demodulation component 140. The MIMO demodulation component 140 may be implemented by the memory 360 and the TX processor 368, the RX processor 356, and/or the controller/processor 359. For example, the memory 360 may store executable instructions defining the MIMO demodulation component 140 and the TX processor 368, the RX processor 356, and/or the controller/processor 359 may execute the instructions.

The UE 104 may include a receiver component 970, which may include, for example, a RF receiver for receiving the signals described herein via antennas 974. The UE 104 may include a transmitter component 972, which may include, for example, an RF transmitter for transmitting the signals described herein. In an aspect, the receiver component 970 and the transmitter component 972 may co-located in a transceiver such as the TX/RX 354 in FIG. 3.

As discussed with respect to FIG. 1, the MIMO demodulation component 140 includes the request component 142, the indication component 144, and the iterative demodulation component 146. In some implementations, the MIMO demodulation component 140 may optionally include a training component 910, a decoder 920 and/or an alternative demodulator 930.

The receiver component 970 may receive DL signals described herein such as the SSB 510, system information 515, slot indication 540 and MIMO transmissions 550 or 570. The receiver component 970 may output the SSB 510 and/or system information 515 to the MIMO demodulation component 140 as control signaling (e.g., indicating MIMO capability). The receiver component 970 may output the slot indication 540 to the indication component 144. The receiver component 970 may output the MIMO transmissions 550, 570 to the iterative demodulation component 146.

The request component 142 is configured to transmit the request 535 for precoder information for iterative demodulation of spatially separated streams from the UE 104 via the transmitter component 972. For example, the request component 142 may transmit the request 535 as a MAC-CE or a capability message (e.g., RRC). In some implementations, the request component 142 is configured to a transmit a refresh request 585. For example, the request component 142 may transmit the refresh request 585 in response to a threshold error from the iterative demodulation component 146 indicating that the iterative demodulator cannot satisfy a threshold error rate based on a current modulation and coding scheme and number of slots since the precoder was evaluated.

The indication component 144 is configured to receive the slot indication 540 via the receiver component 970. The slot indication 540 may include a slot number, a gap length, and/or a refresh rate. The indication component 144 may determine a gap length since the last slot from which the precoder 820 at the network entity was evaluated. The indication component 144 may output the gap length to the iterative demodulation component 146.

In some implementations, the training component 910 is configured to generate a mapping 710 of a gap length between the slot in which the last single variable decomposition based precoder was evaluated and a current slot to a number of iterations for the iterative demodulation to satisfy an error vector magnitude threshold. For example, the training component 910 may simulate iterative decoding to determine an EVM after different numbers of iterations. The training component 910 may select the mapping 710 such that the number of iterations can satisfy the threshold 610 for the gap length. In some implementations, the number of iterations is further based on one or both of: a delay spread or a MCS. The training component 910 may determine the mapping based MCS, link capacity, and velocity. For example, the training component 910 may execute multiple simulations with different MCS, link capacity, and velocity to determine different mappings.

The iterative demodulation component 146 is configured to perform iterative demodulation with a number of iterations based on the latest slot from which the precoder was evaluated. For example, the iterative demodulation component 146 may select the number of iterations based on a mapping of a gap length between the slot in which the last single variable decomposition based precoder was evaluated and a current slot to a number of iterations for the iterative demodulation to satisfy an error vector magnitude threshold 610. The iterative demodulation component 146 may perform the CG algorithm or another iterative algorithm to demodulate the MIMO transmission 550, 570 using the selected number of iterations. The iterative demodulation component 146 outputs the demodulated symbols to a decoder 920.

Figure 10:
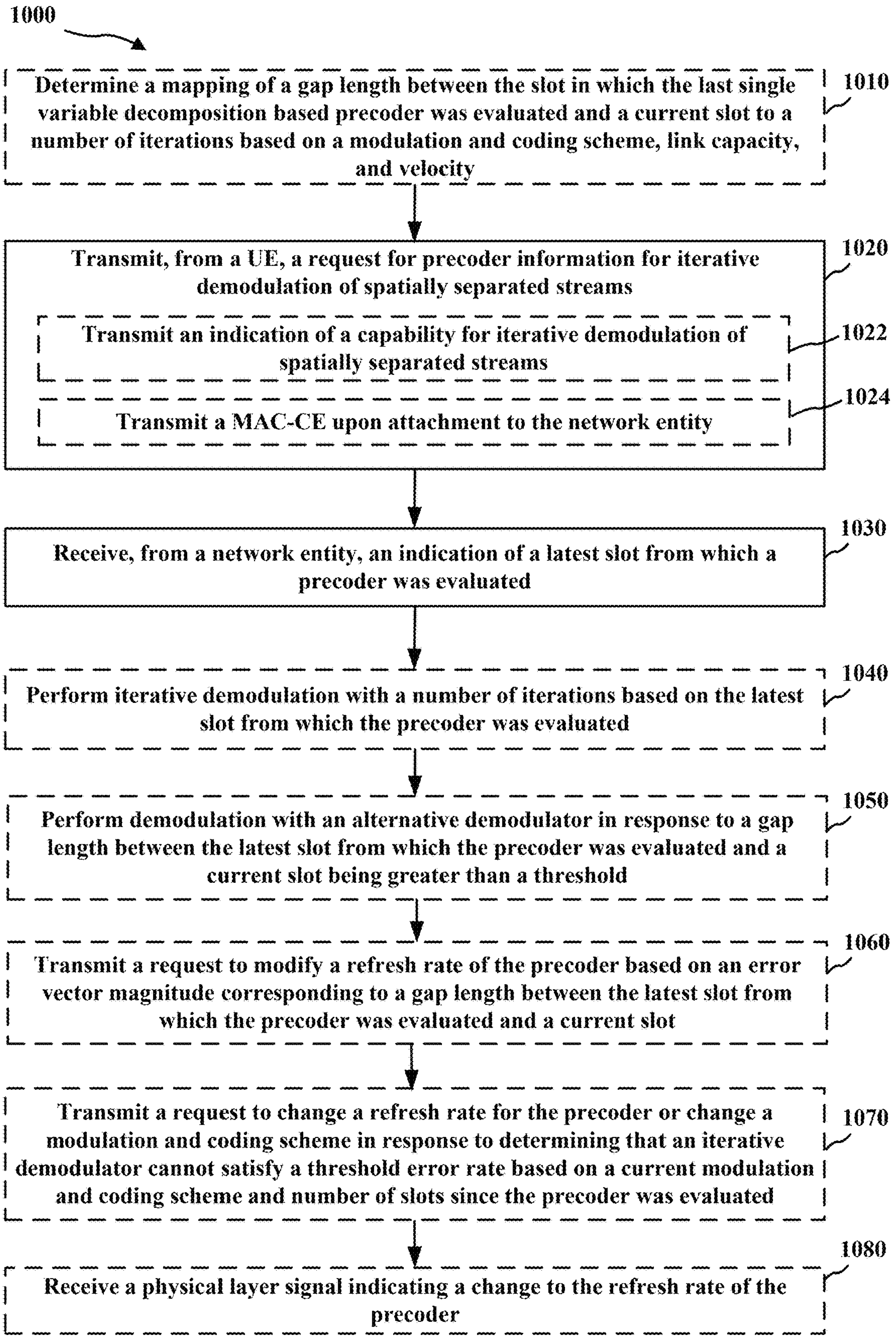
FIG. 10 is a flowchart of an example method for a user equipment to iteratively demodulate a MIMO transmission.

FIG. 10 is a flowchart of an example method 1000 demodulating a multiple-input multiple-output (MIMO) transmission. The method 1000 may be performed by a UE (such as the UE 104, which may include the memory 360 and which may be the entire UE 104 or a component of the UE 104 such as the MIMO demodulation component 140, TX processor 368, the RX processor 356, or the controller/processor 359). The method 1000 may be performed by MIMO demodulation component 140 in communication with a precoding component 120 of the base station 102. Optional blocks are shown with dashed lines.

At block 1010, the method 1000 may optionally include determining a mapping of a gap length between the slot in which the last single variable decomposition based precoder was evaluated and a current slot to a number of iterations based on a modulation and coding scheme, link capacity, and velocity. In some implementations, for example, the UE 104, the RX processor 356 or the controller/processor 359 may execute the MIMO demodulation component 140 or the training component 910 to determine the mapping 710 of a gap length between the slot in which the last single variable decomposition based precoder was evaluated and a current slot to a number of iterations based on a modulation and coding scheme, link capacity, and velocity. Accordingly, the UE 104, the RX processor 356, or the controller/processor 359 executing the MIMO demodulation component 140 or the training component 910 may provide means for determining a mapping of a gap length between the slot in which the last single variable decomposition based precoder was evaluated and a current slot to a number of iterations based on a modulation and coding scheme, link capacity, and velocity.

At block 1020, the method 1000 includes transmitting, from a UE, a request for precoder information for iterative demodulation of spatially separated streams. In some implementations, for example, the UE 104, the TX processor 368 or the controller/processor 359 may execute the MIMO demodulation component 140 or the request component 142 to transmit, from the UE 104, the request 535 for precoder information for iterative demodulation of spatially separated streams. In some implementations, at sub-block 1022, the block 1020 may optionally include transmitting an indication of a capability for iterative demodulation of spatially separated streams. In some implementations, at sub-block 1024, the block 1020 may optionally include transmitting a MAC-CE upon attachment to the network entity. Accordingly, the UE 104, the TX processor 368, or the controller/processor 359 executing the MIMO demodulation component 140 or the request component 142 may provide means for transmitting, from a UE, a request for precoder information for iterative demodulation of spatially separated streams.

At block 1030, the method 1000 includes receiving, from a network entity, an indication of a latest slot from which a precoder was evaluated. In some implementations, for example, the UE 104, the RX processor 356 or the controller/processor 359 may execute the MIMO demodulation component 140 or the indication component 144 to receive, from a network entity, an indication of a latest slot from which a precoder 820 was evaluated. Accordingly, the UE 104, the RX processor 356, or the controller/processor 359 executing the MIMO demodulation component 140 or the indication component 144 may provide means for receiving, from a network entity, an indication of a latest slot from which a precoder was evaluated.

At block 1040, the method 1000 may optionally include performing iterative demodulation with a number of iterations based on the latest slot from which the precoder was evaluated. In some implementations, for example, the UE 104, the RX processor 356 or the controller/processor 359 may execute the MIMO demodulation component 140 or the iterative demodulation component 146 to perform iterative demodulation with a number of iterations based on the latest slot from which the precoder was evaluated. For example, the iterative demodulation component 146 may execute the selected number of iterations of the CG algorithm. Accordingly, the UE 104, the RX processor 356, or the controller/processor 359 executing the MIMO demodulation component 140 or the iterative demodulation component 146 may provide means for performing iterative demodulation with a number of iterations based on the latest slot from which the precoder was evaluated.

At block 1050, the method 1000 may optionally include performing demodulation with an alternative demodulator in response to a gap length between the latest slot from which the precoder was evaluated and a current slot being greater than a threshold. In some implementations, for example, the UE 104, the RX processor 356 or the controller/processor 359 may execute the MIMO demodulation component 140 or the alternative demodulator 930 to perform demodulation with an alternative demodulator in response to a gap length between the latest slot from which the precoder was evaluated and a current slot being greater than a threshold. For example, the alternative demodulator 930 may be a PSRD demodulator. Accordingly, the UE 104, the RX processor 356, or the controller/processor 359 executing the MIMO demodulation component 140 or the alternative demodulator 930 may provide means for performing demodulation with an alternative demodulator in response to a gap length between the latest slot from which the precoder was evaluated and a current slot being greater than a threshold.

At block 1060, the method 1000 may optionally include transmitting a request to modify a refresh rate of the precoder based on an error vector magnitude corresponding to a gap length between the latest slot from which the precoder was evaluated and a current slot. In some implementations, for example, the UE 104, the TX processor 368 or the controller/processor 359 may execute the MIMO demodulation component 140 or the request component 142 to transmit a request 585 to modify a refresh rate of the precoder based on an error vector magnitude corresponding to a gap length between the latest slot from which the precoder was evaluated and a current slot. Accordingly, the UE 104, the TX processor 368, or the controller/processor 359 executing the MIMO demodulation component 140 or the request component 142 may provide means for transmitting a request to modify a refresh rate of the precoder based on an error vector magnitude corresponding to a gap length between the latest slot from which the precoder was evaluated and a current slot.

At block 1070, the method 1000 may optionally include transmitting a request to change a refresh rate for the precoder or change a modulation and coding scheme in response to determining that an iterative demodulator cannot satisfy a threshold error rate based on a current modulation and coding scheme and number of slots since the precoder was evaluated. In some implementations, for example, the UE 104, the TX processor 368 or the controller/processor 359 may execute the MIMO demodulation component 140 or the request component 142 to transmit a request 585 transmit a request to change the refresh rate for the precoder or change a modulation and coding scheme in response to determining that an iterative demodulator cannot satisfy a threshold error rate based on a current modulation and coding scheme and number of slots since the precoder was evaluated. Accordingly, the UE 104, the TX processor 368, or the controller/processor 359 executing the MIMO demodulation component 140 or the request component 142 may provide means for transmitting a request to change a refresh rate for the precoder or change a modulation and coding scheme in response to determining that an iterative demodulator cannot satisfy a threshold error rate based on a current modulation and coding scheme and number of slots since the precoder was evaluated.

At block 1080, the method 1000 may optionally include receiving a physical layer signal indicating a change to the refresh rate of the precoder. In some implementations, for example, the UE 104, the RX processor 356 or the controller/processor 359 may execute the MIMO demodulation component 140 or the indication component 144 to receive a physical layer signal indicating a change to the refresh rate of the precoder. Accordingly, the UE 104, the RX processor 356, or the controller/processor 359 executing the MIMO demodulation component 140 or the indication component 144 may provide means for receiving a physical layer signal indicating a change to the refresh rate of the precoder.

Figure 11:
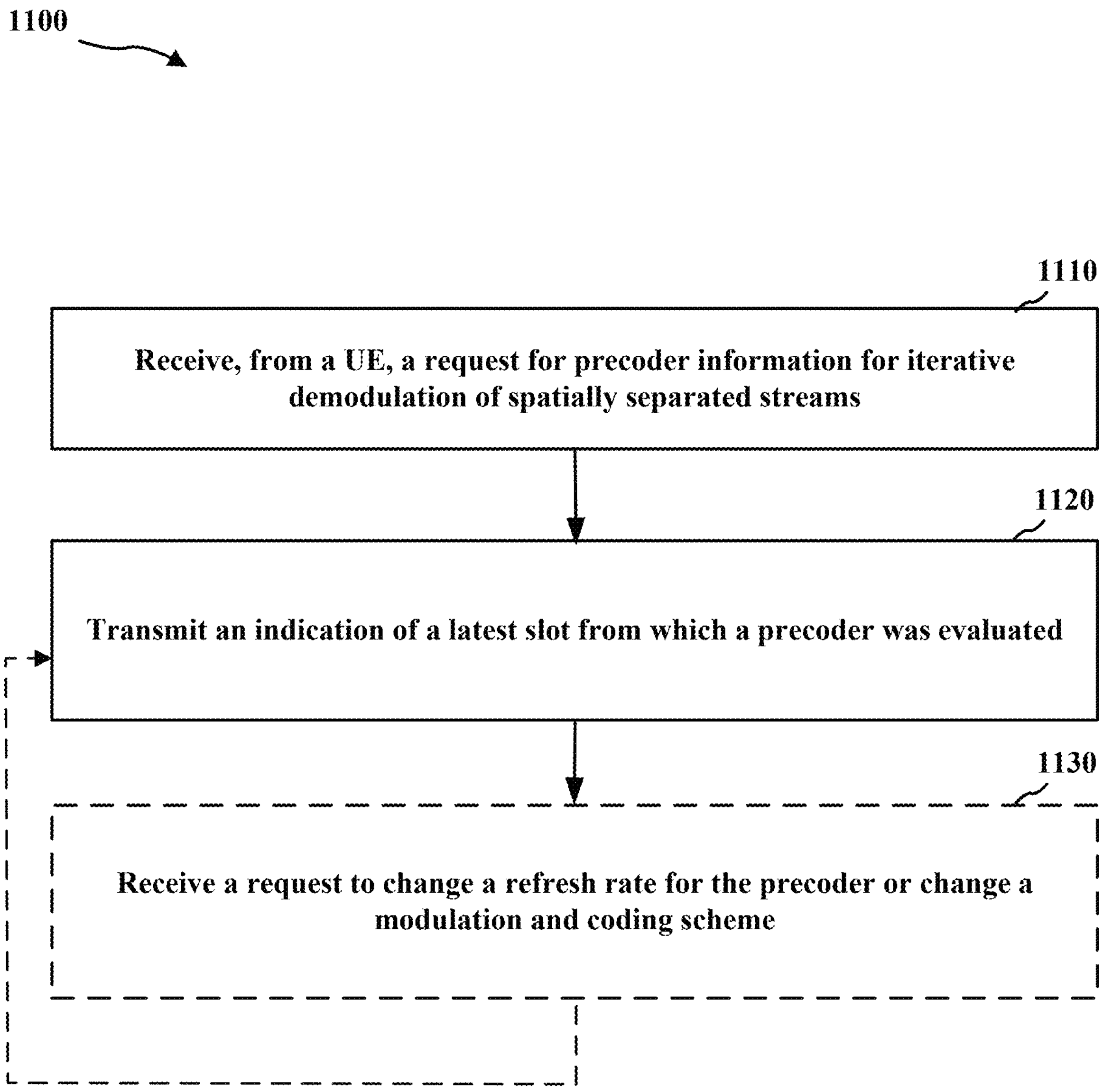
FIG. 11 is a flowchart of an example method for a network element to facilitate iterative demodulation of a MIMO transmission.

FIG. 11 a flowchart of an example method 1000 for a base station to facilitate reception of a MIMO transmission using iterative demodulation. The method 1100 may be performed by a base station (such as the base station 102, which may include the memory 376 and which may be the entire base station 102 or a component of the base station 102 such as the precoding component 120, TX processor 316, the RX processor 370, or the controller/processor 375). The method 1000 may be performed by the precoding component 120 in communication with the MIMO demodulation component 140 of the first UE 104. Optional blocks are shown with dashed lines.

At block 1110, the method 1000 includes receiving, from a UE, a request for precoder information for iterative demodulation of spatially separated streams. In some implementations, for example, the base station 102, RX processor 370, or the controller/processor 375 may execute the precoding component 120 or the request receiving component 122 to receive, from a UE, a request for precoder information for iterative demodulation of spatially separated streams. In some implementations, the request 535 for precoder information is an indication of a capability for iterative demodulation of spatially separated streams. In some implementations, the request receiving component 122 is configured to configured to receive a MAC-CE upon attachment of the UE to the network entity. Accordingly, the base station 102, RX processor 370, or the controller/processor 375 executing the precoding component 120 or the request receiving component 122 may provide means for receiving, from a UE, a request for precoder information for iterative demodulation of spatially separated streams.

At block 1120, the method 1100 includes transmitting an indication of a latest slot from which a precoder was evaluated. In some implementations, for example, the base station 102, TX processor 316, or the controller/processor 375 may execute the precoding component 120 or the precoder evaluation component 124 to transmit an indication 540 of a latest slot from which a precoder 820 was evaluated. In some implementations, the indication of the latest slot from which the precoder was evaluated includes an indication of a refresh rate of the precoder. Accordingly, the base station 102, the TX processor 316, or the controller/processor 375 executing the precoding component 120 or the precoder evaluation component 124 may provide means for transmitting an indication of a latest slot from which a precoder was evaluated.

At block 1130, the method 1100 may optionally include receiving a request to change a refresh rate for the precoder or change a modulation and coding scheme. In some implementations, for example, the base station 102, RX processor 370, or the controller/processor 375 may execute the precoding component 120 or the request receiving component 122 to receive the request 585 to change a refresh rate for the precoder or change a modulation and coding scheme. In some implementations, the method 1100 may return to block 1120 to transmit a new slot indication 540 if the refresh rate for the precoder is changed. Accordingly, the base station 102, RX processor 370, or the controller/processor 375 executing the precoding component 120 or the request receiving component 122 may provide means for receiving a request to change a refresh rate for the precoder or change a modulation and coding scheme.

The following numbered clauses provide an overview of aspects of the present disclosure:

Clause 1. An apparatus for wireless communication, comprising: one or more memories storing computer-executable instructions; and one or more processors coupled with the one or more memories and configured to execute the computer-executable instructions, individually or in combination, to cause the apparatus to: transmit, from a user equipment (UE), a request for precoder information for iterative demodulation of spatially separated streams; and receive, from a network entity, an indication of a latest slot from which a precoder was evaluated.

Clause 2. The apparatus of clause 1, wherein the one or more processors, individually or in combination, are configured to perform iterative demodulation with a number of iterations based on the latest slot from which the precoder was evaluated.

Clause 3. The apparatus of clause 2, wherein the number of iterations is based on a mapping of a gap length between the latest slot from which the precoder was evaluated and a current slot to a number of iterations for the iterative demodulation to satisfy an error vector magnitude threshold.

Clause 4. The apparatus of clause 3, wherein the number of iterations is further based on one or both of: a delay spread or a modulation and coding scheme (MCS).

Clause 5. The apparatus of clause 3, wherein the one or more processors, individually or in combination, are configured to determine the mapping based on a modulation and coding scheme, link capacity, and velocity.

Clause 6. The apparatus of clause 1, wherein the one or more processors, individually or in combination, are configured to transmit a request to change a refresh rate for the precoder or change a modulation and coding scheme in response to determining that an iterative demodulator cannot satisfy a threshold error rate based on a current modulation and coding scheme and number of slots since the precoder was evaluated.

Clause 7. The apparatus of clause 1, wherein the request for precoder information is an indication of a capability for iterative demodulation of spatially separated streams.

Clause 8. The apparatus of clause 1, wherein to transmit the request for precoder information, the one or more processors, individually or in combination, are configured to transmit a media access control-control element (MAC-CE) upon attachment to the network entity.

Clause 9. The apparatus of clause 1, wherein the indication of the latest slot from which the precoder was evaluated includes an indication of a refresh rate of the precoder.

Clause 10. The apparatus of clause 9, wherein the one or more processors, individually or in combination, are configured to receive a physical layer signal indicating a change to the refresh rate of the precoder.

Clause 11. The apparatus of clause 1, wherein the one or more processors, individually or in combination, are configured to transmit a request to modify a refresh rate of the precoder based on an error vector magnitude corresponding to a gap length between the latest slot from which the precoder was evaluated and a current slot.

Clause 12. The apparatus of clause 1, wherein the one or more processors, individually or in combination, are configured to perform demodulation with an alternative demodulator in response to a gap length between the latest slot from which the precoder was evaluated and a current slot being greater than a threshold.

Clause 13. An apparatus for wireless communication at a network entity, comprising: one or more memories storing computer-executable instructions; and one or more processors coupled with the one or more memories and configured to execute the computer-executable instructions, individually or in combination, to cause the apparatus to: receive, from a user equipment (UE), a request for precoder information for iterative demodulation of spatially separated streams; and transmit an indication of a latest slot from which a precoder was evaluated.

Clause 14. The apparatus of clause 13, wherein the one or more processors, individually or in combination, are configured to receive a request to change a refresh rate for the precoder or change a modulation and coding scheme.

Clause 15. The apparatus of clause 13, wherein the request for precoder information is an indication of a capability for iterative demodulation of spatially separated streams.

Clause 16. The apparatus of clause 13, wherein to receive the request for precoder information, the one or more processors, individually or in combination, are configured to receive a media access control-control element (MAC-CE) upon attachment of the UE to the network entity.

Clause 17. The apparatus of clause 13, wherein the indication of the latest slot from which the precoder was evaluated includes an indication of a refresh rate of the precoder.

Clause 18. A method of wireless communication, comprising: transmitting, from a user equipment (UE), a request for precoder information for iterative demodulation of spatially separated streams; and receiving, from a network entity, an indication of a latest slot from which a precoder was evaluated.

Clause 19. The method of clause 18, further comprising performing demodulation with a number of iterations based on the latest slot from which the precoder was evaluated.

Clause 20. The method of clause 19, wherein the number of iterations is based on a mapping of a gap length between the latest slot from which the precoder was evaluated and a current slot to a number of iterations for the iterative demodulation to satisfy an error vector magnitude threshold.

Clause 21. The method of clause 20, wherein the number of iterations is further based on one or both of: a delay spread or a modulation and coding scheme (MCS).

Clause 22. The method of clause 20, further comprising determining the mapping based on a modulation and coding scheme, link capacity, and velocity.

Clause 23. The method of clause 18, further comprising transmitting a request to change an update rate for the precoder or change a modulation and coding scheme in response to determining that an iterative demodulator cannot satisfy a threshold error rate based on a current modulation and coding scheme and a number of slots since the precoder was evaluated.

Clause 24. The method of clause 18, wherein the request for precoder information is an indication of a capability for iterative demodulation of spatially separated streams.

Clause 25. The method of clause 18, wherein transmitting the request for precoder information comprises transmitting a media access control-control element (MAC-CE) upon attachment to the network entity.

Clause 26. The method of clause 18, wherein the indication of latest slot from which the precoder was evaluated includes an indication of a refresh rate of the precoder.

Clause 27. The method of clause 26, further comprising receiving a physical layer signal indicating a change to the refresh rate of the precoder.

Clause 28. The method of clause 18, further comprising transmitting a request to modify a refresh rate of the precoder based on an error vector magnitude corresponding to a gap length between the latest slot from which the precoder was evaluated and a current slot.

Clause 29. The method of clause 18, further comprising performing demodulation with an alternative demodulator in response to a gap length between the latest slot from which the precoder was evaluated and a current slot being greater than a threshold.

Clause 30. A method of wireless communication at a network entity, comprising: receiving, from a user equipment (UE), a request for precoder information for iterative demodulation of spatially separated streams; and transmitting an indication of a latest slot from which a precoder was evaluated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
one or more memories storing computer-executable instructions; and
one or more processors coupled with the one or more memories and configured to execute the computer-executable instructions, individually or in combination, to cause the apparatus to:
transmit, from a user equipment (UE), a request for precoder information for iterative demodulation of spatially separated streams;
receive, from a network entity, an indication of a latest slot from which a precoder was evaluated; and
perform the iterative demodulation with a number of iterations based on the latest slot from which the precoder was evaluated, wherein the number of iterations is based on a mapping of a gap length between the latest slot from which the precoder was evaluated and a current slot.

2. The apparatus of claim 1, wherein the mapping maps the gap length to a number of iterations for the iterative demodulation to satisfy an error vector magnitude threshold.

3. The apparatus of claim 2, wherein the number of iterations is further based on one or both of: a delay spread or a modulation and coding scheme (MCS).

4. The apparatus of claim 2, wherein the one or more processors, individually or in combination, are configured to determine the mapping based on a modulation and coding scheme, link capacity, and velocity.

5. The apparatus of claim 1, wherein the one or more processors, individually or in combination, are configured to transmit a request to change a refresh rate for the precoder or change a modulation and coding scheme in response to determining that an iterative demodulator cannot satisfy a threshold error rate based on a current modulation and coding scheme and number of slots since the precoder was evaluated.

6. The apparatus of claim 1, wherein the request for the precoder information is an indication of a capability for iterative the demodulation of spatially separated streams.

7. The apparatus of claim 1, wherein to transmit the request for the precoder information, the one or more processors, individually or in combination, are configured to transmit a media access control-control element (MAC-CE) upon attachment to the network entity.

8. The apparatus of claim 1, wherein the indication of the latest slot from which the precoder was evaluated includes an indication of a refresh rate of the precoder.

9. The apparatus of claim 8, wherein the one or more processors, individually or in combination, are configured to receive a physical layer signal indicating a change to the refresh rate of the precoder.

10. The apparatus of claim 1, wherein the one or more processors, individually or in combination, are configured to transmit a request to modify a refresh rate of the precoder based on an error vector magnitude corresponding to the gap length between the latest slot from which the precoder was evaluated and the current slot.

11. The apparatus of claim 1, wherein the one or more processors, individually or in combination, are configured to perform demodulation with an alternative demodulator in response to the gap length between the latest slot from which the precoder was evaluated and the current slot being greater than a threshold.

12. An apparatus for wireless communication at a network entity, comprising:
- one or more memories storing computer-executable instructions; and
- one or more processors coupled with the one or more memories and configured to execute the computer-executable instructions, individually or in combination, to cause the apparatus to:
  - receive, from a user equipment (UE), a request for precoder information for iterative demodulation of spatially separated streams;
  - transmit an indication of a latest slot from which a precoder was evaluated; and
  - transmit, to the UE, a multiple-input multiple-output (MIMO) transmission precoded with the precoder, wherein the indication of the latest slot from which the precoder was evaluated is for the UE to perform the iterative demodulation of the spatially separated streams with a number of iterations based on a mapping of a gap length between the latest slot from which the precoder was evaluated and a current slot.

13. The apparatus of claim 12, wherein the one or more processors, individually or in combination, are configured to:
- receive a request to change a refresh rate for the precoder or change a modulation and coding scheme; and
- change the refresh rate for the precoder or change the modulation and coding scheme in response to the request.

14. The apparatus of claim 12, wherein the request for the precoder information is an indication of a capability for the iterative demodulation of the spatially separated streams.

15. The apparatus of claim 12, wherein to receive the request for the precoder information, the one or more processors, individually or in combination, are configured to receive a media access control-control element (MAC-CE) upon attachment of the UE to the network entity.

16. The apparatus of claim 12, wherein the indication of the latest slot from which the precoder was evaluated includes an indication of a refresh rate of the precoder.

17. A method of wireless communication, comprising:
- transmitting, from a user equipment (UE), a request for precoder information for iterative demodulation of spatially separated streams;
- receiving, from a network entity, an indication of a latest slot from which a precoder was evaluated; and
- performing the iterative demodulation with a number of iterations based on the latest slot from which the precoder was evaluated, wherein the number of iterations is based on a mapping of a gap length between the latest slot from which the precoder was evaluated and a current slot.

18. The method of claim 17, wherein the mapping maps the gap length to a number of iterations for the iterative demodulation to satisfy an error vector magnitude threshold.

19. The method of claim 18, wherein the number of iterations is further based on one or both of: a delay spread or a modulation and coding scheme (MCS).

20. The method of claim 18, further comprising determining the mapping based on a modulation and coding scheme, link capacity, and velocity.

21. The method of claim 17, further comprising transmitting a request to change an update rate for the precoder or change a modulation and coding scheme in response to determining that an iterative demodulator cannot satisfy a threshold error rate based on a current modulation and coding scheme and a number of slots since the precoder was evaluated.

22. The method of claim 17, wherein the request for the precoder information is an indication of a capability for the iterative demodulation of the spatially separated streams.

23. The method of claim 17, wherein transmitting the request for the precoder information comprises transmitting a media access control-control element (MAC-CE) upon attachment to the network entity.

24. The method of claim 17, wherein the indication of latest slot from which the precoder was evaluated includes an indication of a refresh rate of the precoder.

25. The method of claim 24, further comprising receiving a physical layer signal indicating a change to the refresh rate of the precoder.

26. The method of claim 17, further comprising transmitting a request to modify a refresh rate of the precoder based on an error vector magnitude corresponding to the gap length between the latest slot from which the precoder was evaluated and the current slot.

27. The method of claim 17, further comprising performing demodulation with an alternative demodulator in response to the gap length between the latest slot from which the precoder was evaluated and the current slot being greater than a threshold.

28. A method of wireless communication at a network entity, comprising:
- receiving, from a user equipment (UE), a request for precoder information for iterative demodulation of spatially separated streams;
- transmitting an indication of a latest slot from which a precoder was evaluated; and
- transmitting, to the UE, a multiple-input multiple-output (MIMO) transmission precoded with the precoder, wherein the indication of the latest slot from which the precoder was evaluated is for the UE to perform the iterative demodulation of the spatially separated streams with a number of iterations based on a mapping of a gap length between the latest slot from which the precoder was evaluated and a current slot.

* * * * *